United States Patent
Liu et al.

(10) Patent No.: US 8,874,144 B1
(45) Date of Patent: Oct. 28, 2014

(54) SELECTING LOCATION-BASED CONTENT

(71) Applicant: Google Inc., Mountain View, CA (US)

(72) Inventors: Yifang Liu, Redwood City, CA (US);
Ping Wu, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/137,480

(22) Filed: Dec. 20, 2013

Related U.S. Application Data (63) Continuation of application No. 14/047,691, filed on Oct. 7, 2013.

(51) Int. Cl.
*H04W 4/02* (2009.01)
*H04W 24/00* (2009.01)

(52) U.S. Cl.
CPC ..................... *H04W 4/028* (2013.01)
USPC ..................... 455/456.3; 455/456.1

(58) Field of Classification Search
USPC ........ 455/456.1, 456.3, 456.6, 457, 566, 145; 715/273, 703, 761, 828, 864
See application file for complete search history.

(56) References Cited

U.S. PATENT DOCUMENTS

| | | | |
|---|---|---|---|
| 7,634,354 B2 * | 12/2009 | Salmre | 701/438 |
| 7,764,231 B1 * | 7/2010 | Karr et al. | 342/457 |
| 8,005,489 B2 | 8/2011 | Fransioli | |
| 8,255,393 B1 * | 8/2012 | Yu et al. | 707/724 |
| 8,279,069 B2 | 10/2012 | Sawyer | |
| 8,489,326 B1 | 7/2013 | Na et al. | |
| 2009/0177484 A1 * | 7/2009 | Davis et al. | 705/1 |
| 2010/0056113 A1 * | 3/2010 | Silverman | 455/413 |
| 2011/0275386 A1 * | 11/2011 | Rekimoto | 455/456.1 |
| 2012/0065802 A1 * | 3/2012 | Seeber et al. | 700/295 |
| 2013/0041761 A1 | 2/2013 | Voda | |
| 2013/0288638 A1 * | 10/2013 | Baker et al. | 455/405 |
| 2013/0321403 A1 * | 12/2013 | Piemonte et al. | 345/419 |
| 2013/0321422 A1 * | 12/2013 | Pahwa et al. | 345/428 |
| 2013/0346916 A1 * | 12/2013 | Williamson et al. | 715/800 |
| 2014/0035957 A1 * | 2/2014 | Ingulsrud | 345/676 |

\* cited by examiner

*Primary Examiner* — Cong Tran
(74) *Attorney, Agent, or Firm* — Foley & Lardner LLP; John D. Lanza (57) ABSTRACT

Systems and methods include retrieving data indicative of a sequence of content that were previously selected for presentation by a mobile device based in part on physical locations of the mobile device. The sequence of selected content may be used with the current location of the mobile device to determine a likelihood score for a piece of content. Based on the likelihood score, the piece of content may be selected and provided to the mobile device for presentation.

20 Claims, 5 Drawing Sheets

SELECTING LOCATION-BASED CONTENT

CROSS-REFERENCES TO RELATED APPLICATIONS

This application claims the benefit of priority under 35 U.S.C. §120 as a continuation of U.S. patent application Ser. No. 14/047,691, filed Oct. 7, 2013, which is incorporated by reference herein in its entirety.

BACKGROUND

Mobile devices come in a variety of different forms such as laptop computers, tablet computers, and smartphones that are often carried by a user. A mobile device may also include hardware that determines the location of the device. For example, a smartphone may include a GPS receiver that determines the location of the smartphone using received satellite signals.

SUMMARY

Implementations of the systems and methods for selecting location-based content are disclosed herein. One implementation is a method of selecting location-based content. The method includes retrieving, from a memory device, data indicative of a sequence of third-party content that were previously selected for presentation by a mobile device based in part on physical locations of the mobile device. The method further includes receiving, at one or more processors, a current location of the mobile device. The method also includes analyzing, by one or more processors, a piece of third-party content, the sequence of third-party content that were selected for presentation by the mobile device, and the current location of the mobile device to determine a likelihood score for the piece of third-party content that represents a likelihood of an interaction occurring with the piece of third-party content at the mobile device if the piece of third-party content is selected for presentation by the mobile device. The method additionally includes selecting, by the one or more processors, the piece of third-party content for presentation by the mobile device based in part on the likelihood score. The method also includes providing the piece of third-party content to the mobile device for presentation.

Another implementation is a system for selecting location-based content. The system includes one or more processors operable to retrieve, from a memory device, data indicative of a sequence of third-party content that were previously selected for presentation by a mobile device based in part on physical locations of the mobile device. The one or more processors are also operable to receive a current location of the mobile device. The one or more processors are further operable to analyze a piece of third-party content, the sequence of third-party content that were selected for presentation by the mobile device, and the current location of the mobile device to determine a likelihood score for the piece of third-party content that represents a likelihood of an interaction occurring with the piece of third-party content at the mobile device if the piece of third-party content is selected for presentation by the mobile device. The one or more processors are also operable to select the piece of third-party content for presentation by the mobile device based in part on the likelihood score. The one or more processors are additionally operable to provide the piece of third-party content to the mobile device for presentation.

A further implementation is a computer-readable storage medium having machine instructions stored therein that are executable by one or more processors to cause the one or more processors to perform operations. The operations include retrieving, from a memory device, data indicative of a sequence of third-party content that were previously selected for presentation by a mobile device based in part on physical locations of the mobile device. The operations also include receiving a current location of the mobile device. The operations further include analyzing a piece of third-party content, the sequence of third-party content that were selected for presentation by the mobile device, and the current location of the mobile device to determine a likelihood score for the piece of third-party content that represents a likelihood of an interaction occurring with the piece of third-party content at the mobile device if the piece of third-party content is selected for presentation by the mobile device. The operations additionally include selecting the piece of third-party content for presentation by the mobile device based in part on the likelihood score. The operations further include providing the piece of third-party content to the mobile device for presentation.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, first-party and third-party content may be provided to a client device. As used herein, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or an advertisement that appears in conjunction with a requested webpage (e.g., a search result webpage from a search engine, a webpage that includes an online article, a webpage of a social networking service, etc.) or within a stand-alone application (e.g., an advertisement within a game, a messaging program, a navigation program, etc.). Generally, a first-party content provider may be any content provider that allows another content provider (i.e., a third-party content provider) to provide content in conjunction with that of the first-party. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different advertisements selected by the service during different visits to the webpage. The content selection service may determine which third-party content is provided based on any number of factors. For example, a third-party advertisement for golf clubs may appear on a webpage devoted to reviews of golf resorts. The content selection service may also conduct a content auction to select the third-party content to be provided from among the various third-party content providers.

According to various implementations, a content selection service may select third-party content for a mobile device based in part on the current location of the device, if the user of the device has elected to share his or her location with the content selection service. For example, assume that a mobile device is located within a short distance of a retail establishment. Based on the location of the device, the content selection service may select an advertisement for the retail establishment to be presented by the mobile device to the user. In turn, the user may be more inclined to visit the establishment.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location, etc.) do so, or to control whether or how to receive content from the content service that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. A content selection service may also delete the current location of a mobile device after using this information to select content for the device. Thus, the content selection service may not retain a history of a user's locations, to protect the user's privacy.

According to various implementations, a sequence of location-based content previously selected by a content selection service may be analyzed to determine a likelihood score for a piece of third-party content (e.g., a score representing the likelihood of the user interacting with the third-party content). For example, assume that a user walks down Main Street every day on his way to work. If the content selection service maintains a history of the user's travels, it may use this information to predict how likely the user is to react to a certain piece of third-party content (e.g., the system may provide the user with advertisements for businesses along the user's predicted trajectory). However, this history may not be available to the service if the service deletes the user's current location after each use. In various implementations, the sequence of third-party content previously selected for a mobile device may be used as a proxy for the actual set of locations of the mobile device. For example, assume that the user walking down Main street was previously presented with advertisements for a restaurant, a retail store, a bakery, and a pharmacy, respectively, based on the locations of the user's mobile device. Using this sequence, the content selection service may predict that the user is much more likely to click on an advertisement for a pharmacy (e.g., due to the user approaching a pharmacy on Main Street), if the user was presented with a sequence of advertisements for the restaurant, the retail store, and the bakery.

Figure 1:
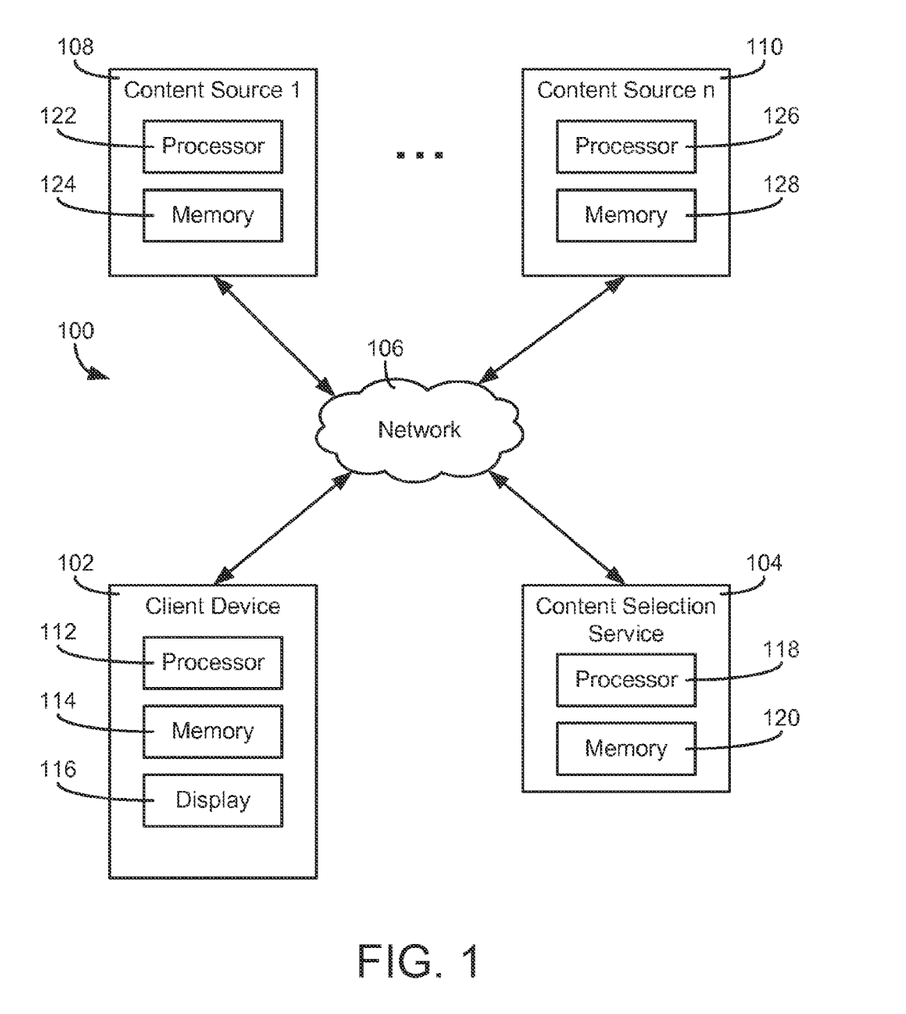
FIG. 1 is a block diagram of a computer system in accordance with various implementations.

Referring now to FIG. 1, a block diagram of a computer system 100 is shown, according to various implementations. System 100 includes a client device 102 which communicates with other computing devices via a network 106. Client device 102 may execute a web browser or other application (e.g., a video game, a messenger program, a media player, a social networking application, a navigation program, etc.) to retrieve content from other devices over network 106. For example, client device 102 may communicate with any number of content sources 108, 110 (e.g., a first content source through nth content source). Content sources 108, 110 may provide webpage data and/or other content, such as images, video, audio, or applications to client device 102. Computer system 100 may also include a content selection service 104 configured to select content to be provided to client device 102. For example, content source 108 may provide a first-party webpage to client device 102 that includes additional third-party content selected by content selection service 104. In another example, content selection service 104 may select a third-party advertisement for presentation within a non-browser application running on client device 102.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, application specific integrated circuits (ASICs), field programmable gate arrays (FPGAs), other forms of processing circuits, or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Client device 102 may include one or more hardware circuits configured to determine a location of client device 102. For example, client device 102 may include a GPS receiver that determines the location of client device 102 using satellite signals. In another example, a cellular receiver of client device 102 may be used to determine the location of client device 102 using triangulation. In one implementation, the location of client device 102 may be determined based on a known location of a network access point. For example, assume that client device 102 accesses network 106 from a WiFi hotspot in a particular coffee shop. Based on the hotspot, it may be determined that client device 102 is located in or near the coffee shop.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, and other forms of electronic documents. Similar to client device 102, content sources 108, 110 may include processors 122, 126 and memories 124, 128, respectively, that store program instructions executable by processors 122, 126. For example, memory 124 of content source 108 may include instructions such as web server software, FTP serving software, or other types of software that cause content source 108 to provide content via network 106.

Similar to content sources 108, 110, content selection service 104 may be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processor 118 and a memory 120 that stores program instructions executable by processor 118. In cases in which content selection service 104 is a combination of computing devices, processor 118 may represent the collective processors of the devices and memory 120 may represent the collective memories of the devices.

Client device 102 may identify itself to content selection service 104 through the use of one or more device identifiers. Device identifiers may include, but are not limited to, cookies, universal device identifiers (UDIDs), device serial numbers, telephone numbers, or network addresses. For example, content selection service 104 may set a cookie on client device 102 when client device 102 visits a particular webpage. On subsequent webpage visits, the cookie may be sent by client device 102 to content selection service 104, allowing content selection service 104 to attribute the different webpage visits to the same client device.

According to various implementations, content sources 108, 110 may provide webpage data to client device 102 that includes one or more content tags. In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. In other words, a content tag may cause client device 102 to send a content selection request to content selection service 104. For example, content source 108 may provide webpage data that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108-110.

Content sources 108, 110 may also provide an executable application to client device 102. Applications may include, but are not limited to, messaging programs (e.g., chat programs, email programs, text messaging programs, etc.), navigation programs, games, scheduling programs (e.g., programs that allow a user maintain a list of appointments, etc.), social networking applications, and content-streaming programs (e.g., audio streaming applications, video streaming applications, etc.). In other implementations, an application installed on client device 102 may be pre-installed (e.g., by the manufacturer or retailer) and configured to receive content from content sources 108, 110. For example, a pre-installed media player application may be configured to download or stream a song from content source 108. An application executed by client device 102 may be configured to provide a device identifier for the application to content selection service 104. For example, the application may be configured to generate and/or provide a UDID or other device identifier to content selection service 104. Such a device identifier may be provided by client device 102 to content selection service 104 as part of a content selection request. For example, a game on client device 102 may request an advertisement from content selection service 104 to be presented within the game.

Content selection service 104 may receive and use history data associated with a device identifier to select relevant content for the user of client device 102. History data may be any data associated with a device identifier that is indicative of actions or events that occurred at client device 102 (e.g., visiting a webpage, interacting with presented content, conducting a search, making a purchase, downloading content, etc.). For example, a cookie may be sent from client device 102 to content selection service 104 when the user of client device 102 visits a particular webpage devoted to a topic. In another example, a non-browser application on client device 102 may provide history data to content selection service 104 when a particular type of event occurs in the application (e.g., the player reaches a new level of a game, a song or video clip finishes playing, etc.). In further examples, history data may include data regarding whether a particular piece of third-party content has already been provided to client device 102 or another device associated with the user of client device 102 (e.g., to control how often a particular piece of selected content is presented to a user). Based in part on the analyzed history data, content selection service 104 may select third-party content to be provided in conjunction with first-party content (e.g., as part of a displayed webpage, as a pop-up, within a video game, within another type of application, etc.).

Content selection service 104 may analyze received history data associated with a device identifier to identify one or more topics that may be of interest to the corresponding user. Content selection service 104 may then associate an identified topic with the device identifier. For example, content selection service 104 may perform text and/or image analysis on a webpage from content source 108, to determine one or more topics of a webpage visited by the device identifier. In some implementations, a topic may correspond to a predefined interest category used by content selection service 104. Such an interest category may be associated with the device identifier by content selection service 104. For example, a webpage devoted to the topic of golf may be classified under the interest category of sports. If history data for a device identifier signifies a visit to the golf-related webpage, the interest category of sports may be associated with the device identifier and used by content selection service 104 to select content for the device identifier. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category.

For situations in which personal information about the user of client device 102 is collected or used to select third-party content, the user may be provided with an opportunity to control whether programs or features that may collect personal information (e.g., information about a user's social network, social actions or activities, a user's preferences, or a user's current location) do so, or an opportunity to control whether or how to receive content from content selection service 104 that may be more relevant to the user. In addition, certain data may be treated in one or more ways before it is stored or used by content selection service 104, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by content selection service 104.

In various implementations, content selection service 104 may select third-party content for presentation by client device 102 based in part on a location received from client device 102. For example, assume that client device 102 is identified as located in or near a particular coffee shop. Based in part on this information, content selection service 104 may select a third-party advertisement for the coffee shop for presentation to the user of client device 102.

According to various implementations, content selection service 104 may store data regarding third-party content that was selected for presentation by client device 102 based on the locations of client device 102. For example, content selection service 104 may store in memory 120 data regarding the identity of the third-party content provider, a topic of the selected content, a timestamp indicative of when the content was provided to client device 102, or other such information. In some implementations, content selection service 104 may use the sequence of previously presented third-party content (e.g., content selected based on the location of client device 102) to select future content for client device 102. For example, content selection service 104 may use the sequence of previously presented third-party content to generate a likelihood score for a particular piece of third-party content. Such a likelihood score may represent the probability of the user of client device 102 interacting with the piece of third-party content (e.g., by clicking or otherwise selecting the content).

In one implementation, content selection service 104 may use a sequence of previously presented content as an input to a machine learning model, to determine a likelihood score for a particular piece of third-party content. The machine learning model may be any form of machine learning model. For example, the model may be a logistic regression model, a Bayesian model, an ensemble model, or the like. In general, the model may receive as input the sequence of previously presented content that were selected by content selection service 104 based on the locations of client device 102, the current location of client device 102, and information regarding the piece of third-party content under study. In response, the model may output a likelihood score representing the probability of the user of client device 102 clicking or otherwise reacting to the piece of third-party content. In one implementation, the model may also take as input a sequence of content that was determined by content selection service 104 to be relevant to the location of client device 102, but were not provided to client device 102 in favor of other content.

The third-party content selected by content selection service 104 may be provided by content selection service 104 to client device 102 via network 106. For example, content source 110 may upload the third-party content to content selection service 104. Content selection service 104 may then provide the third-party content to client device 102 to be presented in conjunction with a first-party webpage provided by content source 108 or in a stand-alone application executed by client device 102. In other implementations, content selection service 104 may provide an instruction to client device 102 that causes client device 102 to retrieve the selected third-party content (e.g., from memory 114 of client device 102, from content source 110, etc.).

Third-party content selected by content selection service 104 for presentation by client device 102 may be associated with an application available for download from one of content sources 108-110 or content selection service 104 itself. For example, content selection service 104 may select and provide an advertisement that advertises an application (e.g., a game, a media player, etc.) or other data file (e.g., a music file, a video file, etc.) available for download. The third-party content associated with a downloadable application may be hotlinked or otherwise interactive such that clicking or otherwise interacting with the content via a user interface device causes client device 102 to navigate to the content source from which the application is available. In some implementations, the linked content source is an application market. For example, client device 102 may execute an application specifically configured to access the application market in response to the user of client device 102 clicking on an advertisement for a game application. In other implementations, the content source is a webpage or website provided by one of content sources 108-110 from which the application is available for download. For example, clicking on an advertisement for a downloadable game may cause client device 102 to launch a web browser that navigates to a webpage from which the application is available.

Figure 2:
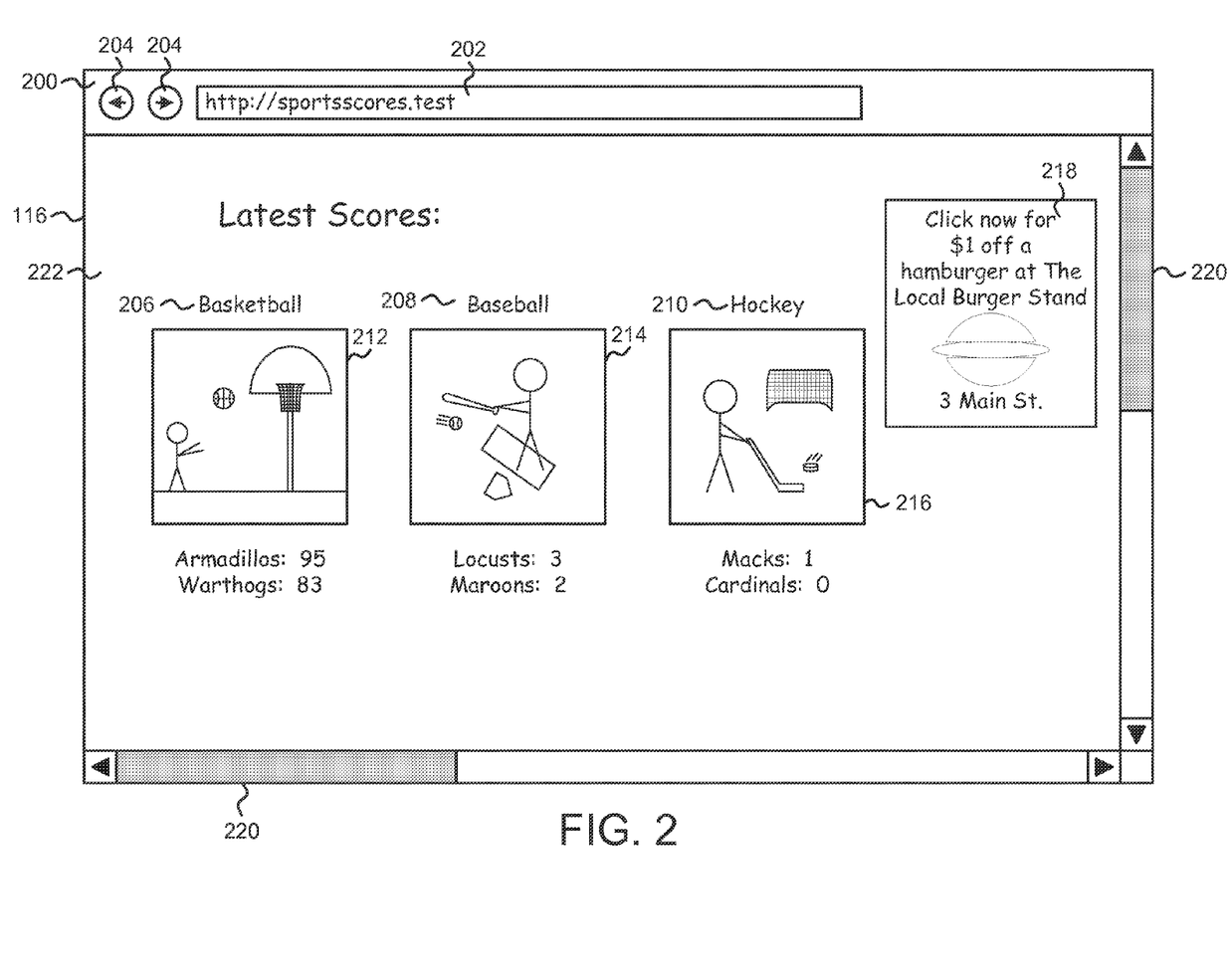
FIG. 2 depicts one implementation of an electronic display showing a webpage with selected third-party content.

Referring now to FIG. 2, an illustration is shown of electronic display 116 displaying an example webpage 222, according to one implementation. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, a URL may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of webpage 222. In some implementations, webpage data may be one or more files of webpage code written in a markup language, such as the hypertext markup language (HTML), extensible HTML (XHTML), extensible markup language (XML), or any other markup language. The webpage data may include data that specifies where indicia appear on webpage 222, such as text 206, 208, 210. In some implementations, the webpage data may also include additional URL information used by web browser 200 to retrieve additional indicia displayed on webpage 222. For example, the webpage data may also include one or more instructions used by processor 112 to retrieve images 212, 214, 216 from their respective content sources.

Web browser 200 may include a number of navigational controls associated with webpage 222. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of webpage 222 that are currently off-screen. For example, webpage 222 may be formatted to be larger than the screen of electronic display 116. In such a case, the one or more scroll bars 220 may be used to change the vertical and/or horizontal position of webpage 222 on electronic display 116.

One or more content tags may be embedded into the code of webpage 222 that defines a content field located at the position of third-party content 218. Another content tag may cause web browser 200 to request additional content from content selection service 104, when webpage 222 is loaded. In other words, client device 102 may send a content selection request to content selection service 104. Such a request may include one or more keywords, an indication of the visit to webpage 222, or other data used by content selection service 104 to select content to be provided to client device 102. In one example, assume that content selection service 104 has already set a cookie on client device 102 via web browser 200. In such a case, the content selection request may include the cookie, to identify client device 102 to content selection service 104. In response, content selection service 104 may select third-party content 218 using the cookie or other device identifier sent as part of the request. For example, content selection service 104 may analyze history data associated with the cookie and/or history data associated with any other device identifier linked to the cookie, to select third-party content 218. In further implementations, web browser 200 may send the location of client device 102 to content selection service 104 as part of a content selection request. If the content selection request does not include a device identifier, content selection service 104 may set a cookie or other device identifier at this time for use with future requests from client device 102.

As a result of content selection service 104 receiving the cookie set via web browser 200 whenever client device 102 visits a website that uses the selection service, content selection service 104 may also receive history data for the cookie. For example, content selection service 104 may receive history data indicative of the device identifier visiting webpage 222, when webpage 222 was visited, and one or more topics of webpage 222. In some implementations, content selection service 104 may use text recognition on webpage 222 (e.g., on text 206, 208, 210, etc.) and/or image recognition on webpage 222 (e.g., on images 212, 214, 216, etc.), to determine one or more topics of webpage 222. In further implementations, webpage data for webpage 222 may include metadata that identifies the topic. Such topics may then be used to select content for the cookie and/or any other device identifiers linked to the cookie.

In some cases, a content tag in the code of webpage 222 may be a script executed by web browser 200 when webpage 222 is loaded. In various implementations, the script may determine a hardware and/or software configuration of client device 102. For example, an embedded script on webpage 222 may query which plugins are installed in web browser 200 or whether client device 102 includes a GPS or other location-determining circuit. In one implementation, the script may access an API of a navigation program or another application installed on client device 102 that determines the location of client device 102.

As shown, third-party content 218 may be selected by content selection service 104 for presentation by client device 102 based in part on the current location of client device 102.

For example, assume that client device 102 is traveling down Main Street and is approaching a restaurant, "The Local Burger Stand." If the location of client device 102 is included in the content selection request sent to content selection service 104, content selection service 104 may determine that an advertisement for the restaurant is of high relevance to the user, based on the user's proximity to the restaurant. In further implementations, third-party content 218 may be selected for presentation based on both the current location of client device 102 and a sequence of third-party content that was previously selected based on the locations of client device 102 and/or other devices. For example, third-party content 218 may be selected based in part on a sequence of location-based content that includes an advertisement for a bowling alley, a baseball stadium, and The Local Burger Stand in chronological order.

In some implementations, content selection service 104 may provide third-party content 218 directly to client device 102. In other implementations, content selection service 104 may send a command to client device 102 that causes client device 102 to retrieve third-party content 218. For example, the command may cause client device 102 to retrieve third-party content 218 from a local memory, if third-party content 218 is already stored in memory 114, or from a networked content source. In this way, any number of different pieces of content may be placed in the location of third-party content 218 on webpage 222. In other words, one user that visits webpage 222 may be presented with third-party content 218 and a second user that visits webpage 222 may be presented with different content. Other forms of content (e.g., an image, text, an audio file, a video file, etc.) may be selected by content selection service 104 for display with webpage 222 in a manner similar to that of third-party content 218. In further implementations, content selected by content selection service 104 may be displayed outside of webpage 222. For example, content selected by content selection service 104 may be displayed in a separate window or tab of web browser 200, may be presented via another software application (e.g., a text editor, a media player, etc.), or may be downloaded to client device 102 for later use.

Figure 3:
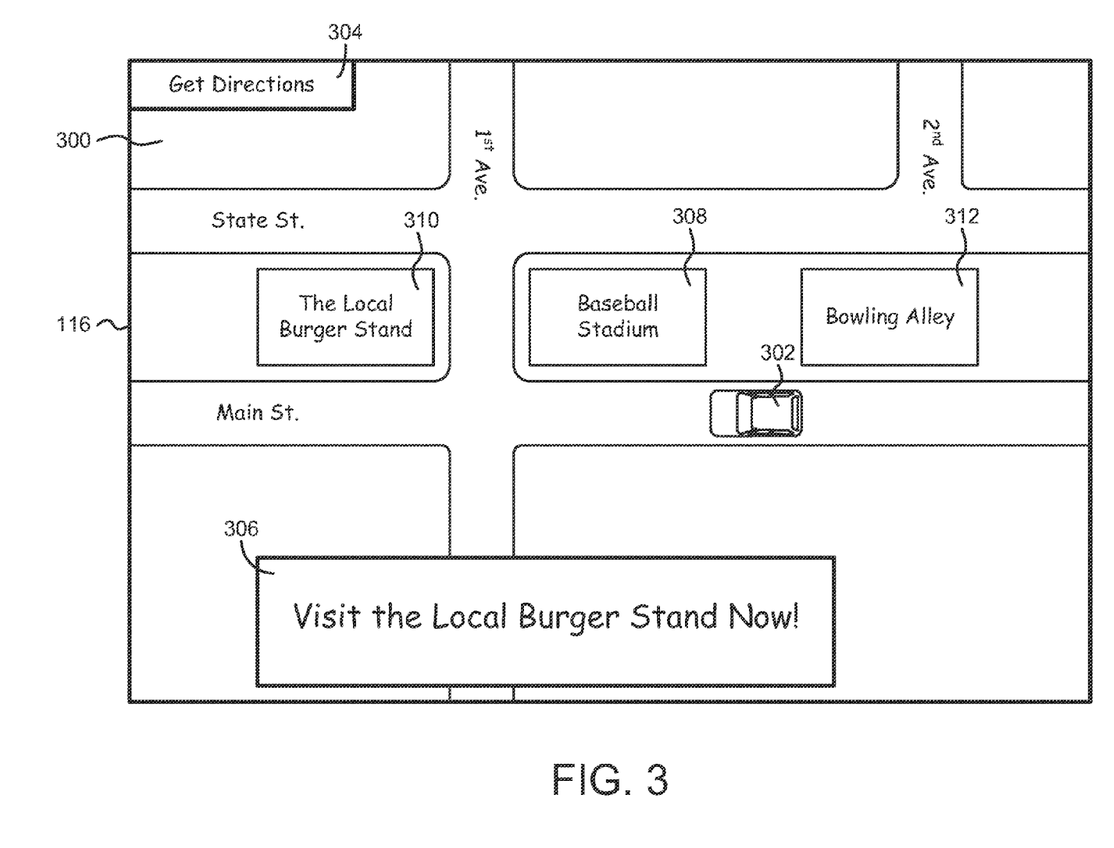
FIG. 3 depicts one implementation of an electronic display showing a navigation application with selected third-party content.

Referring now to FIG. 3, an application displaying selected content is shown, according to one illustrative implementation. As shown, client device 102 may execute a navigation application 300. In general, navigation application 300 operates by determining the location of client device 102 and providing indicia, such as a map, to electronic display 116. For example, client device 102 may include a GPS receiver and/or may use cellular triangulation to determine its location. Navigation application 300 may use the determined location to retrieve a map of the location either from a local memory or from a remote source. Navigation application 300 may then provide the map to electronic display 116 with an indication 302 of the determined location of client device 102. Navigation application 300 may also include a selectable input 304 configured to allow the user of client device 102 to obtain directions to another geographic location. For example, the user of client device 102 may select input 304 to obtain driving directions from the location indicated by indication 302 to another location.

Navigation application 300 may be configured to send a UDID or other form of device identifier as part of a content selection request to content selection service 104. In some implementations, the UDID may be a hashed value, thereby anonymizing the UDID to ensure the privacy of the user of client device 102. Such a content selection request may include various information, such as the general or specific location of client device 102. For example, assume that the user of client device 102 is currently driving down Main Street and will soon pass both baseball stadium 308 and restaurant 310. In some cases, application 300 may report this location information to content selection service 104 when requesting third-party content.

In response to receiving the content selection request from navigation application 300, content selection service 104 may select third-party content 306 for presentation within application 300. As shown, third-party content 306 is an advertisement for the restaurant, "The Local Burger Stand." Interacting with third-party content 306 (e.g., clicking on content 306, touching a touch screen in the area of content 306, etc.) may cause client device 102 to launch a web browser that navigates to a webpage of the advertiser. In another example, clicking on third-party content 306 may cause navigation application 300 to display directions to restaurant 310 associated with third-party content 306.

Third-party content 306 may be selected based in part on the current location of client device 102 and on a sequence of third-party content previously selected by content selection service 104 using location information. For example, assume that content selection service 104 had previously selected advertisements for a bowling alley 312, the baseball stadium 308, and restaurant 310 in sequence. In such a case, content selection service 104 may use this sequence to predict how likely the user of client device 102 is to click or otherwise select third-party content 306 when presented. Assume, for example, that the user of client device 102 and/or users of other devices demonstrate a higher than normal click-through rate on restaurant-related advertisements when the users are presented with the sequence of advertisements. In other words, content selection service 104 may treat a sequence of previously presented third-party content as a proxy for the trajectory of client device 102.

In some implementations, content selection service 104 may also base the selection of third-party content 306 on one or more sequences of third-party content that were determined to be location-relevant but were not actually presented by client device 102. For example, assume that content selection service 104 selected two advertisements that were determined to be relevant to the location of client device 102, but that only one of the two advertisements had a topic that matched an interest category associated with the device. In such a case, content selection service 104 may use information regarding both pieces of third-party content to assess a sequence of third-party content, to select third-party content 306.

Figure 4:
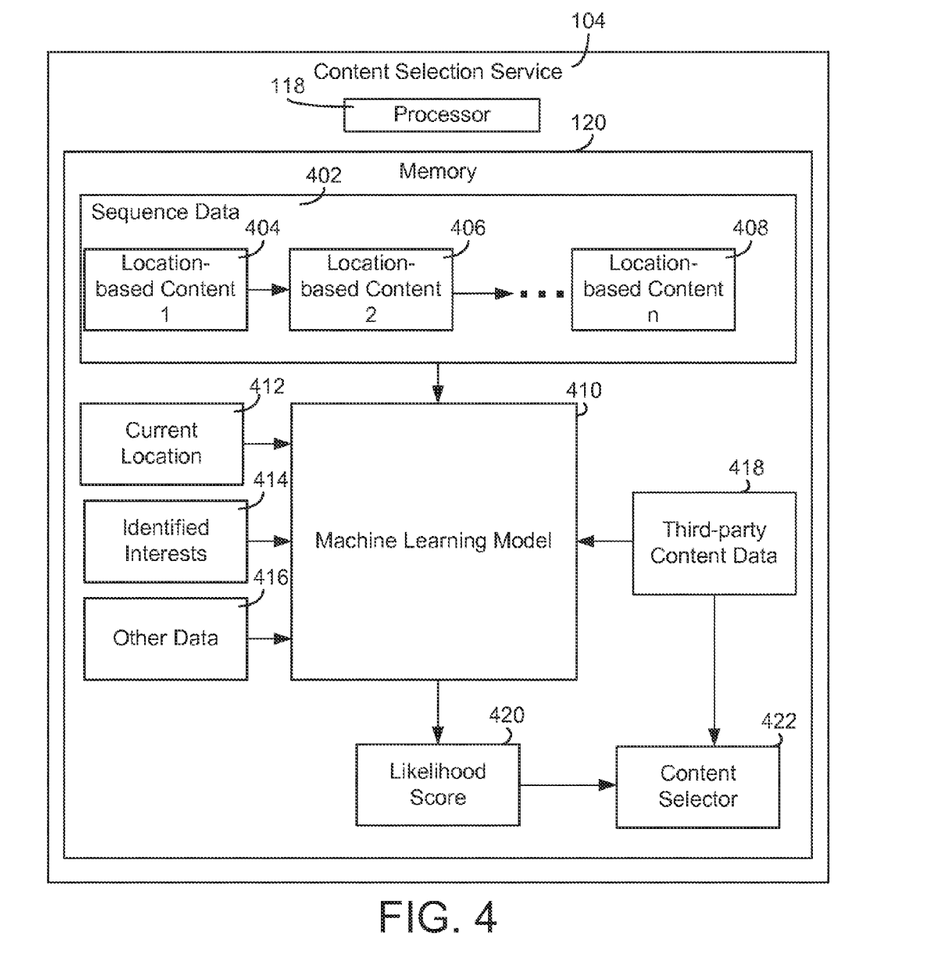
FIG. 4 is a block diagram of the content selection service of FIG. 1 in which content is selected based on the location of a mobile device, according to some implementations.

Referring now to FIG. 4, a block diagram is shown of content selection service 104 of FIG. 1 in which content is selected based on location of a device, according to some implementations. As shown, content selection service 104 may include processor 118 that executes instructions stored in memory 114, such as a machine learning model 410 and a content selector 422. In various implementations processor 118 and memory 120 may be singular electronic components or may represent a combination of components. For example, content selection service 104 may be a single computing device or may represent a plurality of computing devices (e.g., in a data center) in communication with one another that perform the operations described herein.

Content selection service 104 may store and retrieve sequence data 402 of third-party content that was previously selected based on the locations of one or more client devices. As shown, sequence data 402 may include information regarding a first piece of content 404, a second piece of content 406, through an nth piece of content 408. Associated with content 404-408 may be information regarding the topics of content 404-408. For example, content 404 may be associated with the topic of bowling, while content 406 may be associated with the topic of baseball. In some cases, sequence data 402 also includes data regarding whether or not a content interaction occurred after any of the content in the sequence were presented to a user (e.g., the user clicked or otherwise selected the content via an input device).

In one implementation, a timestamp may be associated with each of content 404-408 in sequence data 402. The timestamp may represent the time that the content was determined to be relevant by content selection service 104 and/or the time that the content was provided to a client device. For example, content 404 may have a timestamp that indicates that content 404 was presented on Aug. 11, 2015 at 3:00 PM while content 406 may have a timestamp that indicates that content 406 was presented on Aug. 11, 2015 at 3:02 PM.

Content selection service 104 may also receive a current location 412 of a client device. For example, client device 102 may send its location to content selection service 104 via network 106 in conjunction with a content selection request. Current location 412 may be determined directly by the device itself (e.g., via a GPS receiver, via on-device triangulation, etc.), in some cases. In other cases, current location 412 may identify a network access point that is used by the client device. In one implementation, content selection service 104 may associate a geographic location with a network access point (e.g., a particular WiFi hotspot is associated with the location of a coffee shop). To protect the privacy of the user, content selection service 104 may also delete current location 412 entirely from memory 114 after use or may flag current location 412 as ineligible for further use to select content for the device. In other words, content selection service 104 may prevent the use of current location 412 to determine likelihood scores after a piece of third-party content is selected for presentation by the device.

In some cases, content selection service 104 may store and retrieve one or more identified interests 414. Interests 414 may be identified by content selection service 104 in any number of different ways and may represent topics that may be of interest to the user. For example, assume that a user of the client device visits a number of webpages devoted to the topic of golf. In such a case, an interest category representing golf may be included in identified interests 414. In some implementations, identified interests 414 may be divided into current, short-term, and/or long-term interests. A current interest may refer to a topic identified from the most recent accessed piece of third-party content by a device identifier. For example, if the most recent webpage visited by a device identifier is devoted to golf, identified interest 414 may include a corresponding interest category as a current interest. A short-term interest may refer to any interest category identified using history data from the recent past. Typically, this time period is between zero days and one day prior to the current time, although other time periods are also possible. A long-term interest may refer to any interest category identified using history data from a greater time period than that of the short-term history. For example, long-term history may include recorded browsing patterns or other online actions from the previous week, month, year, other time periods, or the entirety of the history data for the device identifier.

Content selection service 104 may also store and retrieve other data 416. Other data 416 may be any other data used by content selection service 104 to select location-based, third-party content for a device. In one implementation, other data 416 may include a sequence of location-based content that were previously determined by content selection service 104 to be relevant to the location of a device, but were not actually presented by the device. For example, the sequence may correspond to third-party content having slightly lower likelihood scores, auction bids, quality scores, or any other factor that were lower than that of the third-party content actually selected by content selection service 104 for presentation by the device. In further implementations, other data 416 may include data regarding the first-party content provider with which the third-party content is to be presented such as the type of the publisher. For example, other data 416 may include an indication as to whether the first-party content relates to a news website, a social networking website, a game application, etc.

Content selection service 104 may store and retrieve third-party content data 418. In general, third-party content data 418 may include any information regarding one or more pieces of third-party content evaluated for selection by content selection service 104. Third-party content data 418 may include, but is not limited to, data regarding a topical category of the content (e.g., an ad category or the like), one or more keywords, a format of the content, data regarding the account of the third-party content provider (e.g., an account identifier, a campaign identifier, a content group identifier, etc.), combinations thereof, or the like.

In various implementations, content selection service 104 executes a machine learning model 410 that is operable to generate a likelihood score 420 which represents how likely a user is to interact with a selected piece of third-party content. Sequence data 402, current location 412, identified interests 414, other data 416, and/or third-party content may be used as inputs to machine learning model 410 to generate likelihood score 420. In some implementations, machine learning model 410 may be trained using any of these inputs across any number of different client devices, for one or more specific interest categories, or any other grouping of data received by content selection service 104.

Machine learning model 410 may be any form of machine learning model operable to determine the probability of an event occurring given a set of known inputs. In one implementation, machine learning model 410 is a logistic regression model that treats sequence data 402, current location 412, identified interests 414, other data 416, and/or third-party content data 418 as input signals. In response, machine learning model 410 may generate likelihood score 420 for a particular piece of third-party content under study. In further implementations, machine learning model 410 may be a Bayesian model, a random forest model, an ensemble model, a classification model, or any other machine learning model configured to determine the likelihood of an event occurring based on previous observations.

Likelihood score 420 may be any data value that represents the likelihood of a user interacting with a particular piece of third-party content under analysis. By using sequence data 402 and current location 412 of a device as inputs to machine learning model 410, likelihood score 420 may be based in part on both of these factors. In other words, sequence data 402 may serve as the trajectory of a mobile device that corresponds with current location 412. For example, assume that sequence data 402 includes advertisements that were presented in the following order based on the location of a mobile device: advertisement A, advertisement B, and advertisement C. Also, assume that users who viewed such a sequence were much more likely to click on advertisement C. If advertisements A and B were recently selected by content selection service 104 for presentation to a device based on its location, machine learning model 410 may use the sequence data to increase the likelihood score for advertisement C accordingly.

Content selection service 104 may execute a content selector 422 that is operable to determine which piece of third-party content is to be presented by a client device in conjunction with first-party content. In various implementations, content selector 422 may base the selection in part on a likelihood score 420 associated with a piece of third-party content under analysis. Content selector 422 may also base the content selection on any number of other factors, such as bids submitted in a content auction, quality scores associated with the third-party content, or any other factor that may influence whether a piece of third-party content is selected for presentation by a mobile device. For example, assume that an advertiser submits a cost per click (CPC) bid indicating that the advertiser will pay a certain amount if the user clicks on the advertisement. If the content corresponding to the bid has a low associated likelihood score, content selector 422 may select a different piece of third-party content instead.

In various implementations, content selector 422 may provide the selected third-party content to the mobile device or to another device (e.g., to the first-party content source). In one implementation, content selector 422 may provide an instruction to the mobile device that causes the mobile device to retrieve the third-party content from a local memory cache or from the third-party content provider.

Figure 5:
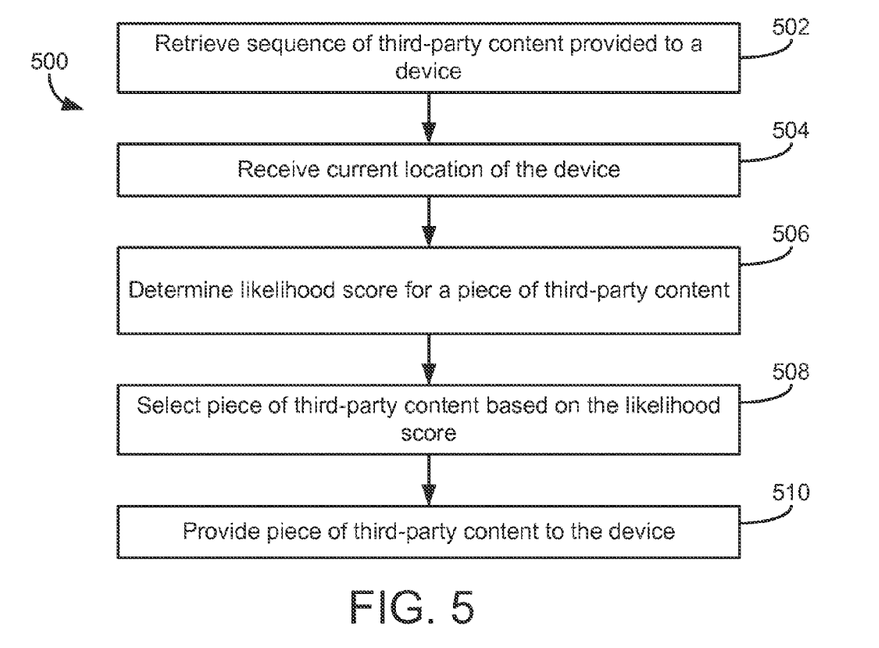
FIG. 5 is a flow diagram depicting the steps taken in one implementation of a process for selecting third-party content based on a location of a mobile device, according to various implementations.

Referring now to FIG. 5, a flow diagram is shown of a process 500 for selecting third-party content based on a location of a mobile device, according to various implementations, according to various implementations. As shown, process 500 includes retrieving a sequence of third-party content provided to a device (step 502), receiving the current location of the device (step 504), determining a likelihood score for a piece of third-party content (step 506), selecting the piece of third-party content for presentation by the device based on the likelihood score (step 508), and providing the piece of third-party content to the device (step 510). In general, process 500 allows third-party content (e.g., an advertisement or the like) to be selected based in part on the location of the mobile device and also based in part on a sequence of location-based, third-party content that were previously selected for presentation. Process 500 may be implemented by one or more computing devices executing stored machine instructions. For example, process 500 may be implemented by a content selection service, such as content selection service 104 shown in FIGS. 1 and 3.

Still referring to FIG. 5 and in more detail, process 500 may include retrieving data indicative of a sequence of third-party content provided to a client device (step 502). For example, content selection service 104 shown in FIG. 4 may retrieve sequence data 402 from memory 114. In various implementations, the third-party content in the sequence were selected based in part on the locations of a mobile device. For example, a sequence may include a first advertisement that was selected based on a first location of the device, a second advertisement that was selected based on a second location of the device, etc. In some implementations, the sequence may include timestamps indicative of when the third-party content was selected for presentation, sent for presentation, actually presented, or the like. Based on the timestamp data, the sequence may be in temporal order. In some cases, the retrieved data may also include data indicative of whether a content interaction occurred after content in the sequence was selected for presentation. For example, the retrieved data may indicate that the fourth advertisement in a sequence was clicked at one or more mobile devices.

Yet still referring to FIG. 5, process 500 may include receiving data indicative of the current location of a mobile device (step 504). For example, content selection service 104 shown in FIG. 4 may receive current location 412 that indicates the location of a mobile device. In some implementations, the current location may be determined by the mobile device itself. For example, the mobile device may utilize a GPS receiver, a cellular transceiver, or the like to determine its current location. In another implementation, the received location may correspond to the identity of a network access point having a known location. For example, the received location may correspond to the identity of a WiFi hotspot that has a known location.

Still referring to FIG. 5, process 500 may include determining a likelihood score for a piece of third-party content (step 506). For example, content selection service 104 shown in FIG. 4 may determine a likelihood score 420 for a piece of third-party content under analysis. In general, a likelihood score represents the probability of a user interacting with a piece of third-party content, such as clicking or otherwise selecting the content via an interface device. According to various implementations, the likelihood score may be based on both the current location of the mobile device and the retrieved sequence of location-based, third-party content. In other words, the sequence of third-party content may be used by the selection service as a proxy for the actual trajectory of the mobile device. In some implementations, the likelihood score may be generated by a machine learning model that uses the sequence of third-party content and the current location of the device as inputs. For example, a logistic regression model may determine the probability of a user clicking on an advertisement based on the current location of the user's mobile device and a sequence of location-based content that were previously selected for presentation. The likelihood score may also be based on other data, such as one or more sequences of location-based content that were not actually presented, information regarding the first-party content (e.g., a type of website, a topic, etc.), one or more interest categories (e.g., current, short-term, or long-term interests), and/or information regarding the third-party content itself (e.g., a topic of the content, a keyword, the third-party content provider, etc.).

Yet still referring to FIG. 5, process 500 may include selecting the piece of third-party content based on the likelihood score (step 508). For example, content selector 422 shown in FIG. 4 may select a particular piece of third-party content based on its associated likelihood score 420. In one implementation, the content selection service may simply compare likelihood scores across multiple pieces of third-party content to determine which piece has the highest likelihood score. In other implementations, the content selection service may base the selection on the likelihood score and an auction bid or other monetary value associated with the placement of the content. For example, the content selection service may select the third-party content having the highest combined likelihood score and auction bid.

Referring still to FIG. 5, process 500 may include providing the piece of third-party content to the device (step 510). In one implementation, the content selection service may provide the selected third-party content to the mobile device directly. In another implementation, the content selection service may provide an instruction to the device that causes the device to retrieve the selected content. For example, the mobile device may be instructed by the selection service to retrieve the selected content directly from the third-party content provider.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for selecting location-based content comprising:
providing, for display on a user device, a first plurality of pieces of third-party content based on a corresponding plurality of locations of the user device, a first location of the corresponding plurality of locations different than a second location of the corresponding plurality of locations;
determining a sequence of third-party content indicating a temporal order in which the first plurality of pieces of third-party content are provided for display on the user device, the sequence comprising topical information and temporal information for each of the first plurality of pieces of third-party content;
identifying, in a data structure stored in a memory element, based on the topical and temporal information of the sequence, historical sequences of third-party content corresponding to the sequence, the historical sequences comprising topical and temporal information corresponding to each of a second plurality of pieces of third-party content in addition to the topical and temporal information corresponding to each the first plurality of pieces of third-party content;
generating likelihood scores for the second plurality of pieces of third-party content, the likelihood scores generated using a machine learning model that determines, based on the historical sequences, a likelihood of an interaction occurring with the second plurality of pieces of third-party content at the user device;
selecting, based on a comparison of likelihood scores, an additional piece of third-party content different from the first plurality of pieces of third-party content; and
providing, responsive to the sequence of the first plurality of pieces of third-party content provided for display, the additional piece of third-party content for display on the user device.

2. The method of claim 1, wherein topical information of the additional piece of third-party content is different from the topical information of each of the first plurality of pieces of third-party content.

3. The method of claim 1, wherein the machine learning model is a logistic regression model.

4. The method of claim 1, further comprising:
receiving a request for a piece of third-party content for display on the user device;
determining a current location of the user device; and
generating the likelihood scores using the current location of the user device.

5. The method of claim 1, further comprising:
receiving a request for a piece of third-party content for display on the user device;
determining a location trajectory of the user device based on the sequence;
identifying a proxy location for the user device based on the location trajectory; and
generating the likelihood scores using the proxy location of the user device.

6. The method of claim 1, further comprising:
determining the location trajectory of the user device based on a comparison of the sequence with the historical sequences.

7. The method of claim 1, further comprising:
selecting the additional piece of content corresponding to a highest likelihood score of the second plurality of pieces of content.

8. The method of claim 1, further comprising:
determining topical information corresponding to a highest likelihood score; and
selecting, based on the topical information, the additional piece of third-party content.

9. The method of claim 1, further comprising:
using the sequence to train the machine learning model.

10. The method of claim 9, further comprising:
retrieving data indicative of a second sequence of third-party content that were determined to be relevant to the user device based on the plurality of locations of the user device but were not selected for display on the user device; and
using the second sequence of third party-content to train the machine learning model.

11. A system for selecting location-based content comprising one or more processors configured to:
provide, for display on a user device, a first plurality of pieces of third-party content based on a corresponding plurality of locations of the user device, a first location of the corresponding plurality of locations different than a second location of the corresponding plurality of locations;
determine a sequence of third-party content indicating a temporal order in which the first plurality of pieces of third-party content are provided for display on the user device, the sequence comprising topical information and temporal information for each of the first plurality of pieces of third-party content;
identify, in a data structure stored in a memory element, based on the topical and temporal information of the sequence, historical sequences of third-party content corresponding to the sequence, the historical sequences comprising topical and temporal information corresponding to each of a second plurality of pieces of third-party content in addition to the topical and temporal information corresponding to each the first plurality of pieces of third-party content;
generate likelihood scores for the second plurality of pieces of third-party content, the likelihood scores generated using a machine learning model that determines, based on the historical sequences, a likelihood of an interaction occurring with the second plurality of pieces of third-party content at the user device;
select, based on a comparison of likelihood scores, an additional piece of third-party content different from the first plurality of pieces of third-party; and
provide, responsive to the sequence of the first plurality of pieces of third-party content provided for display, the additional piece of third-party content for display on the user device.

12. The system of claim 11, wherein topical information of the additional piece of third-party content is different from the topical information of each of the first plurality of pieces of third-party content.

13. The system of claim 11, wherein the machine learning model is a logistic regression model.

14. The system of claim 11, wherein the one or more processors are further configured to:
receive a request for a piece of third-party content for display on the user device;
determine a current location of the user device; and
generate the likelihood scores using the current location of the user device.

15. The system of claim 11, wherein the one or more processors are further configured to:
receive a request for a piece of third-party content for display on the user device;
determine a location trajectory of the user device based on the sequence;
identify a proxy location for the user device based on the location trajectory; and
generate the likelihood scores using the proxy location of the user device.

16. The system of claim 11, wherein the one or more processors are further configured to:
determine the location trajectory of the user device based on a comparison of the sequence with the historical sequences.

17. The system of claim 11, wherein the one or more processors are further configured to:
select the additional piece of content corresponding to a highest likelihood score of the second plurality of pieces of content.

18. The system of claim 11, wherein the one or more processors are further configured to:
determine topical information corresponding to a highest likelihood score; and
select, based on the topical information, the additional piece of third-party content.

19. The system of claim 11, wherein the one or more processors are further configured to:
use the sequence to train the machine learning model.

20. The system of claim 19, wherein the one or more processors are further configured to:
retrieve data indicative of a second sequence of third-party content that were determined to be relevant to the user device based on the plurality of locations of the user device but were not selected for display on the user device; and
use the second sequence of third party-content to train the machine learning model.

* * * * *